United States Patent
Blumer et al.

(10) Patent No.: US 6,189,019 B1
(45) Date of Patent: *Feb. 13, 2001

(54) COMPUTER SYSTEM AND COMPUTER-IMPLEMENTED PROCESS FOR PRESENTING DOCUMENT CONNECTIVITY

(75) Inventors: Thomas P. Blumer, Bellevue; Robert J. Mauceri, Jr., Seattle, both of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/696,704

(22) Filed: Aug. 14, 1996

(51) Int. Cl.[7] .............................. G06F 17/21; G06F 17/30
(52) U.S. Cl. .......................... 707/513; 707/102; 345/357
(58) Field of Search .................................. 707/500, 507, 707/513, 514, 533, 100, 102; 345/356, 440, 334, 335, 357

(56) References Cited

U.S. PATENT DOCUMENTS

| | | | |
|---|---|---|---|
| 5,303,367 | * 4/1994 | Leenstra, Sr. et al. | 707/533 |
| 5,634,062 | * 5/1997 | Shimizu et al. | 345/356 |
| 5,694,594 | * 12/1997 | Chang | 395/606 |
| 5,717,922 | * 2/1998 | Hohensee et al. | 707/100 |
| 5,745,360 | * 4/1998 | Leone et al. | 707/513 |
| 5,832,494 | * 11/1998 | Egger et al. | 707/102 |
| 5,835,085 | * 11/1998 | Eick et al. | 345/440 X |
| 5,845,299 | * 12/1998 | Arora et al. | 707/513 |
| 5,911,145 | * 6/1999 | Arora et al. | 707/514 |
| 6,122,647 | * 9/2000 | Horowitz et al. | 707/513 |

OTHER PUBLICATIONS

He et al., A Tool For Hypertext Based System Analysis and Dynamic Evaluation,System Sciences, pp. 5–14, Jan. 4, 1994.*

FrontPage(TM) Professional Web Site Publishing Without Programming, Version 1.0, Vermeer Technologies Inc., pp. 1–87, 1995.*

* cited by examiner

*Primary Examiner*—Joseph H. Feild
(74) *Attorney, Agent, or Firm*—Ronald M. Anderson

(57) ABSTRACT

A method for representing linked document connectivity that produces an easy to use, uncluttered screen display. An outline view shows a web of documents as a limited, hierarchical outline. A link view, operatively connected to the outline view, shows a small region of the web surrounding a focus document. The outline may be expanded or contracted to show documents at several levels of the hierarchy, at each branch. The links to and from the focus document may be expanded to show a plurality of levels of connection outward from the focus document. Links may be followed to change the focus document in the link view, and documents may be selected in outline view, thereby changing the focus document.

40 Claims, 13 Drawing Sheets

| KEY = HOMEPAGE.HTML | VALUE = POINTER TO DOC. STRUCTURE CONTAINING LIST (A.HTML, B.HTML, C.HTML) |
|---|---|
| KEY = A.HTML | VALUE = POINTER TO DOC. STRUCTURE CONTAINING LIST (A.HTML) |
| KEY = B.HTML | VALUE = POINTER TO DOC. STRUCTURE CONTAINING LIST (C.HTML, D.HTML) |
| KEY = C.HTML | VALUE = POINTER TO DOC. STRUCTURE CONTAINING LIST (HOMEPAGE.HTML) |
| KEY = D.HTML | VALUE = POINTER TO DOC. STRUCTURE CONTAINING LIST (HOMEPAGE.HTML) |
| KEY = ORPHAN1.HTML | VALUE = POINTER TO DOC. STRUCTURE CONTAINING LIST (ORPHAN2.HTML) |
| KEY = ORPHAN2.HTML | VALUE = POINTER TO DOC. STRUCTURE CONTAINING EMPTY LIST |

*FIG. 4*

| KEY = HOMEPAGE.HTML | VALUE = DICTIONARY 1 |
|---|---|
| KEY = A.HTML | VALUE = DICTIONARY 2 |
| KEY = B.HTML | VALUE = DICTIONARY 3 |
| KEY = C.HTML | VALUE = DICTIONARY 4 |
| KEY = D.HTML | VALUE = DICTIONARY 5 |
| KEY = ORPHAN1.HTML | VALUE = EMPTY DICTIONARY |
| KEY = ORPHAN2.HTML | VALUE = DICTIONARY 6 |

*FIG. 5*

DICTIONARY 1

| KEY = VALUE = POINTER TO DOCUMENT STRUCTURE FOR C.HTML |
|---|
| KEY = VALUE = POINTER TO DOCUMENT STRUCTURE FOR D.HTML |

*FIG. 5A*

COMPUTER SYSTEM AND COMPUTER-IMPLEMENTED PROCESS FOR PRESENTING DOCUMENT CONNECTIVITY

FIELD OF THE INVENTION

The present invention is in the field of computer systems and processes used for managing documents. This invention may be used in connection with computer systems for authoring electronic documents, other information and computer programs, including computer systems for creating, developing and/or modifying on-line documents and services in a client-server information system. More particularly, the invention is related to managing documents linked together by hypertext links.

BACKGROUND OF THE INVENTION

An on-line information system typically includes one computer system (the server) that makes information available so that other computer systems (the clients) can access the information. The server manages access to the information, which can be structured as a set of independent on-line services. The server and client communicate via messages conforming to a communication protocol and sent over a communication channel such as a computer network or through a dial-up connection.

Typical uses for on-line services include document viewing, electronic commerce, directory lookup, on-line classified advertisements, reference services, electronic bulletin boards, document retrieval, electronic publishing, keyword searching of documents, technical support for products, and directories of on-line services. The service may make the information available free of charge, or for a fee, and may be on publicly accessible or private computer systems.

Information sources managed by the server may include files, databases, and applications on the server system or on an external computer system. The information that the server provides may simply be stored on the server, may be converted from other formats manually or automatically, may be computed on the server in response to a client request, may be derived from data and applications on the server or other machines, or may be derived by any combination of these techniques.

The user of an on-line service uses a program on the client system to access the information managed by the on-line service. Possible user capabilities include viewing, searching, downloading, printing, editing, and filing the information managed by the server. The user may also price, purchase, rent, or reserve services or goods offered through the on-line service.

An on-line service for catalog shopping, which is an exemplary application of this technology, might work as follows. A user running a program on a client system requests a connection to the catalog shopping service using a service name that either is well known or can be found in a directory. The request is received by the server employed by the catalog shopping service, and the server returns an introductory document that asks for an identifier and password. The client program displays this document, and the user fills in an identifier and password that were assigned by the service in a previous visit, and the information is sent to the server. The server verifies the identifier and password against an authorization database, and returns a menu document that is then presented to the user. Each time the user selects a menu item, the selection is sent to the server, and the server responds with the appropriate new page of information, possibly including item descriptions or prices that are retrieved from a catalog database. By selecting a series of menu items, the user navigates to the desired item in the catalog and requests that the item be ordered. The server receives the order request, and returns a form to be completed by the user to provide information about shipping and billing. The user response is returned to the server, and the server enters the order information into an order database.

On-line services are available on the World Wide Web (WWW), which operates over the global Internet. The Internet interconnects a large number of otherwise unrelated computers or sites. Similar services are available on private networks called "Intranets" that may not be connected to the Internet, and through local area networks (LANs). The WWW and similar private architectures provide a "web" of interconnected document objects. On the WWW, these document objects are located at various sites on the global Internet. A more complete description of the WWW is provided in "The World-Wide Web," by T. Berners-Lee, R. Cailliau, A. Luotonen, H. F. Nielsen, and A. Secret, *Communications of the ACM,* 37 (8), pp. 76–82, August 1994, and in "World Wide Web: The Information Universe," by T. Berners-Lee et al., in *Electronic Networking: Research, Applications and Policy,* Vol. 1, No. 2, Meckler, Westport, Conn., Spring 1992.

Among the types of document objects in an on-line service are documents and scripts. Documents that are published on the WWW are written in the Hypertext Markup Language (HTML). This language is described in *HyperText Markup Language Specification*—2.0, by T. Berners-Lee and D. Connolly, RFC 1866, proposed standard, November 1995, and in "World Wide Web & HTML," by Douglas C. McArthur, in *Dr. Dobbs Journal,* December 1994, pp. 18–20, 22, 24, 26 and 86. Many companies also are developing their own enhancements to HTML. HTML documents are generally static, that is, their contents do not change over time unless modified by a service developer. HTML documents can be created using programs specifically designed for that purpose or by executing a script file.

The HTML language is used for writing hypertext documents, which are more formally referred to as Standard Generalized Markup Language (SGML) documents that conform to a particular Document Type Definition (DTD). An HTML document includes a hierarchical set of markup elements; most elements have a start tag, followed by content, followed by an end tag. The content is a combination of text and nested markup elements. Tags, which are enclosed in angle brackets ('<' and '>'), indicate how the document is structured and how to display the document, as well as destinations and labels for hypertext links. There are tags for markup elements such as titles and headers, text attributes such as bold and italic, lists, paragraph boundaries, links to other documents or other parts of the same document, in-line graphic images, and for many other features.

The following lines of HTML briefly illustrate how the language is used:

Some words are <B>bold</B>, others are <I>italic</I>. Here we start a new paragraph.<P>

Here's a link to the <A HREF="http://www.microsoft.com">Microsoft Corporation</A> homepage.

This sample document is a hypertext document because it contains a hypertext "link" to another document, in the line that includes "HREF=." The format of this link is described below. A hypertext document may also have a link to other parts of the same document. Linked documents may generally be located anywhere on the Internet. When a user is viewing the document using a client program called a Web browser (described below), the links are displayed as highlighted words or phrases. For example, using a Web browser, the sample document above might be displayed on the user's screen as follows:

Some words are bold, others are italic. Here we start a new paragraph.

Here's a link to the Microsoft Corporation homepage.

In the Web browser, the link may be selected, for example, by clicking on the highlighted area with a mouse. Typically, the screen cursor changes when positioned on a hypertext link. Selecting a link will cause the associated document to be displayed. Thus, clicking on the highlighted text "Microsoft Corporation" would fetch and display the associated homepage for that entity.

The HTML language also provides a mechanism (the image or "IMG" element) enabling an HTML document to include an image that is stored as a separate file. When the end user views the HTML document, the included image is displayed as part of the document, at the point where the image element occurred in the document.

Another kind of document object in a web is a script. A script is an executable program, or a set of commands stored in a file, that can be run by a server program called a Web server (described below) to produce an HTML document that is then returned to the Web browser. Typical script actions include running library routines or other applications to fetch information from a file or a database, or initiating a request to obtain information from another machine, or retrieving a document corresponding to a selected hypertext link. A script may be run on the Web server when, for example, the end user selects a particular hypertext link in the Web browser, or submits an HTML form request. Scripts are usually written by a service developer in an interpreted language such as Basic, Practical Extraction and Report Language (Perl) or Tool Control Language (Tcl) or one of the Unix operating system shell languages, but they also may be written in more complex programming languages such as "C" and then compiled to produce an executable program. Programming in Tcl is described in more detail in *Tcl and the Tk Toolkit,* by John K. Ousterhout, Addison-Wesley, Reading, Mass., USA, 1994. Perl is described in more detail in *Programming in Perl,* by Larry Wall and Randal L. Schwartz, O'Reilly & Associates, Inc., Sebastopol, Calif., USA, 1992.

Each document object in a web has an identifier called a Universal Resource Identifier (URI). These identifiers are described in more detail in T. Berners-Lee, *"Universal Resource Identifiers in WWW: A Unifying Syntax for the Expression of Names and Addresses of Objects on the Network as used in the World-Wide Web,"* RFC 1630, CERN, June 1994; and T. Berners-Lee, L. Masinter, and M. McCahill, *"Uniform Resource Locators (URL),"* RFC 1738, CERN, Xerox PARC, University of Minnesota, December 1994. A URI allows any object on the Internet to be referred to by name or address, such as in a link in an HTML document as shown above. There are two types of URIs: a Universal Resource Name (URN), and a Uniform Resource Locator (URL). A URN references an object by name within a given name space. The Internet community has not yet defined the syntax of URNs. A URL references an object by defining an access algorithm using network protocols. An example of a URL is "http://www.microsoft.com". A URL has the syntax "scheme://host:port/path?search" where "scheme" identifies the access protocol (such as HTTP, FTP or GOPHER);

"host" is the Internet domain name of the machine that supports the protocol;

"port" is the transmission control protocol (TCP) port number of the appropriate server (if different from the default);

"path" is a scheme-specific identification of the object; and

"search" contains optional parameters for querying the content of the object.

URLs are also used by web servers and browsers on private computer systems, Intranets, or networks, and not just for the WWW.

A site at which documents are made available to network users is called a "Web site" and must run a "Web server" program to provide access to the documents. A Web server program is a computer program that allows a computer on the network to make documents available to the rest of the WWW or a private network. The documents are often hypertext documents in the HTML language, but may be other types of document objects as well, and may include images, audio, and/or video information. The information that is managed by the Web server includes hypertext documents that are stored on the server or are dynamically generated by scripts on the Web server. Several Web server software packages exist, such as the Conseil Europeen pour la Recherche Nucleaire (CERN, the European Laboratory for Particle Physics) server or the National Center for Supercomputing Applications (NCSA) server. Web servers have been implemented for several different platforms, including the Sun Sparc II™ workstation running the Unix operating system, and personal computers with the Intel PENTIUM™ processor running the Microsoft MS-DOS™ operating system and the Microsoft Windows™ operating environment.

Web servers also have a standard interface for running external programs, called the Common Gateway Interface (CGI). CGI is described in more detail in *How to Set Up and Maintain a Web Site,* by Lincoln D. Stein, Addison-Wesley, August 1995. A gateway is a program that handles incoming information requests and returns the appropriate document or generates a document dynamically. For example, a gateway might receive queries, look up the answer in a database to provide a response, and translate the response into a page of HTML so that the server can send the response to the client. A gateway program may be written in a language such as "C" or in a scripting language such as Perl or Tcl or one of the Unix operating system shell languages. The CGI standard specifies how the script or application receives input and parameters, and specifies how output should be formatted and returned to the server.

For security reasons, a Web server machine may limit access to files. To control access to files on the Web server, the Web server program running on the server machine may provide an extra layer of security above and beyond the normal file system and login security procedures of the operating system on the server machine. The Web server program may add further security rules such as: (a) optionally requiring input of a user name and password, completely independent of the normal user name and passwords that the operating system may maintain on user accounts; (b) allowing groups of users to be identified for security purposes, independent of any user group definitions of the operating system; (c) access control for each document object such that only specified users (with optional passwords) or groups of users are allowed access to an object, or so that access is only allowed for clients at specific network addresses, or some combination of these rules; (d) allowing access to the document objects only through a specified subset of the possible HTTP methods; and (e) allowing some document objects to be marked as HTML documents, others to be marked as executable scripts that will generate HTML documents, and others to be marked as other types of objects such as images. Access to the on-line service document objects via a network file system would not conform to the security features of the Web server program and would provide a way to access documents outside of the security provided by the Web server. The Web server program also typically maps document object names that are known to the client to file names on the server file system. This mapping may be arbitrarily complex, and any author or program that tries to access documents on the Web server directly would need to understand this name mapping.

A user (typically using a machine other than the machine used by the Web server) who wishes to access documents available on the network at a Web site must run a client program called a "Web browser." The Web browser program allows the user to retrieve and display documents from Web servers. Some of the popular Web browser programs are: Navigator™ browser from NetScape Communications Corp., of Mountain View, Calif.; Mosaic™ browser from the National Center for Supercomputing Applications (NCSA); WinWeb™ browser, from Microelectronics and Computer Technology Corp. of Austin, Tex.; and Internet Explorer™ from Microsoft Corporation of Redmond, Wash. Web browsers have been developed to run on different platforms, including personal computers with the Intel Corporation PENTIUM™ processor running Microsoft Corporation's MS-DOS™ operating system and Microsoft Corporation's Windows™ environment, and Apple Corporation's Macintosh™ personal computers.

The Web server and the Web browser communicate using the Hypertext Transfer Protocol (HTTP) message protocol and the underlying transmission control protocol/Internet protocol (TCP/IP) data transport protocol of the Internet. HTTP is described in *Hypertext Transfer Protocol—HTTP/ 1.0*, by T. Berners-Lee, R. T. Fielding, H. Frystyk Nielsen, Internet Draft Document, Oct. 14, 1995, and is currently in the standardization process. In HTTP, the Web browser establishes a connection to a Web server and sends an HTTP request message to the server. In response to an HTTP request message, the Web server checks for authorization, performs any requested action, and returns an HTTP response message containing an HTML document in accord with the requested action, or an error message. The returned HTML document may simply be a file stored on the Web server, or may be created dynamically using a script called in response to the HTTP request message. For instance, to retrieve a document, a Web browser may send an HTTP request message to the indicated Web server, requesting a document by reference to the URL of the document. The Web server then retrieves the document and returns it in an HTTP response message to the Web browser. If the document has hypertext links, then the user may again select one of the links to request that a new document be retrieved and displayed. As another example, a user may fill in a form requesting a database search. In response, the Web browser will send an HTTP request message to the Web server including the name of the database to be searched, the search parameters, and the URL of the search script. The Web server calls a search program, passing in the search parameters. The program examines the parameters and attempts to answer the query, perhaps by sending the query to a database interface. When the program receives the results of the query, it constructs an HTML document that is returned to the Web server, which then sends it to the Web browser in an HTTP response message.

Request messages in HTTP contain a "method name" indicating the type of action to be performed by the server, a URL indicating a target object (either document or script) on the Web server, and other control information. Response messages contain a status line, server information, and possible data content. The Multipurpose Internet Mail Extensions (MIME) specification defines a standardized protocol for describing the content of messages that are passed over a network. HTTP request and response messages use MIME header lines to indicate the format of the message. MIME is described in more detail in *MIME (Multipurpose Internet Mail Extensions): Mechanisms for Specifying and Describing the Format of Internet Message Bodies,* Internet RFC 1341, June 1992.

The request methods defined in the current version of the HTTP protocol include GET, POST, PUT, HEAD, DELETE, LINK, and UNLINK. HEAD, DELETE, LINK and UNLINK are less commonly used and are described in more detail in the HTTP/1.0 draft specification cited above. The GET method causes the server to retrieve the object indicated by the given URL and send it back to the client. If the URL refers to a document, then the server responds by sending back the document. If the URL refers to an executable script, then the server executes the script and returns the data produced by the execution of the script. Web browser programs normally use the GET method to send request messages to the Web server to retrieve HTML documents, which the Web browser then displays on the screen at the client computer.

The PUT method, according to the HTTP specification, specifies that the object contained in the request should be stored on the server at the location indicated by a URL. However, most current server implementations do not follow this specification; instead, they simply handle all PUT requests through a single PUT script, which is generally undefined, and must be created by a service author. Web browsers generally do not use the PUT method.

The POST method sends data, usually the user input parameters from an HTML form, to the server. The POST request also contains the URL of a script to be run on the server. The server runs the script, passing the parameters given in the request, and the script generates an HTML output that is returned in the response to the client. In order for a client program to send arbitrary data to the Web server using the current HTTP protocol, the client program must use either the PUT method or the POST method, as these are the only two methods that allow such data transfer to the Web server. Web browsers generally use only the POST method and generally only for the purpose of sending data in connection with forms to be processed.

The combination of the Web server and Web browser communicating using an HTTP protocol over a computer network, as described above, is referred to herein as a web architecture. The web architecture described above is suitable for use in private LANs or on the Internet. A typical on-line service for use on a web architecture will now be described. This type of on-line service includes a Web server program running on a Web server machine, and a set of service files that characterize the on-line service and which are stored on the Web server. The service files include HTML documents, executable scripts or programs to dynamically produce HTML documents, and other files of service information that can be referenced and updated by the scripts and programs. The actual data and scripts that comprise a particular on-line service, including HTML documents and script programs, are generally stored on the server in a separate area designated for that service. Global information about the service is also stored, including data such as the name of the service, the name of the author, revision history, comments about the service, and authorization information. The end user of the on-line service uses a Web browser program on the client machine to send requests to the on-line service and to receive responses from the on-line service. All access by an end user of the on-line service to the service files is managed and controlled by the Web server program. For example, an on-line service might consist of a corporate homepage HTML document, with a link to a second document that is a form for searching the store catalog. The search form may have a "submit" button that causes a script to be run on the Web server, generating a list of product descriptions with prices that is then returned to the Web browser as an HTML document. Each of the HTML documents may have a link to a second script that collects and displays the items that have been ordered. The service also has configuration information, such as a list of authorized users of the service and their passwords.

FIG. 1 shows the steps for using an on-line service, as seen by the end user of the on-line service on the client computer. The end user starts a Web browser program in a step 10, and the program determines the URL of an initial document to display in a step 12. The initial document URL may be determined from a configuration file, or may be programmed into the Web browser, or entered by the user. The browser then sends an HTTP GET request to the Web server in a step 14, giving the URL of the desired document. The browser then waits for a response from the Web server in a step 16. In a step 18, the browser tests the response to determine if it indicates an error message. If the response message from the Web server indicates an error, e.g., if the requested document is not found, then the browser reports the error to the end user in a step 22. Otherwise the response message from the Web server contains the requested document, and the Web browser formats and displays the document on the screen in a step 20, according to the HTML language conventions. In either case, the browser waits for the user to enter the next command in a step 24. For example, the user may request to view a new document either by selecting a hypertext link to the document, by requesting the document from a list of previously visited documents, or by entering the URL of the document that was obtained by the user through some other means. The browser tests the user command to determine if the user is requesting a new document in a step 26. If so, processing continues at step 14, as noted above. If the user is not requesting a new document, the browser tests the command in a step 30 to determine if it is a request to exit the program. If so, processing stops. Otherwise the command is a local command that is handled by the browser in a step 28, without sending an HTTP request. The end user may use local viewing commands, such as commands to scroll through the document, or commands to search for a particular text string in the document. After the browser handles the local command, the browser again waits for the next user command in step 24, as already discussed.

FIG. 2 shows the operation of an on-line service as seen by the Web server program. When the server is started, it runs continuously, waiting to receive a command over the network connection from a client Web browser program in a step 40. The server tests the received command in a step 44 to determine if it is a GET request. If so, the server examines the URL contained in the request in a step 52 to determine if the URL indicates an HTML document that is stored on the server. If the URL does refer to a document, then that document is returned to the Web browser via an HTTP response in a step 58. Otherwise, the URL indicates a script stored on the server, and the Web server runs the script to produce an HTML document in a step 56, and the HTML document is returned to the Web browser as noted with regard to step 58. If the test of step 44 determines that the command is not a GET request, the server tests the command in a step 48 to determine if it is a POST request. If so, the server retrieves the parameters from the POST request in a step 54, which include the URL and parameters for the script. The server then runs the indicated script in step 56 to generate an HTML document, which is returned to the Web browser as described above in connection with step 58. After an HTML document is returned to the Web browser, processing continues at step 40. If the test of step 48 determines that the command is not a POST request, the server returns an error message to the Web browser in a step 50, formatted as an HTML document. The processing continues at step 40, and the server again waits for the next request to repeat the process.

On-line services such as those described above are in high demand. Unfortunately, the task of developing an on-line service is currently one that almost always requires extensive programming skill and much specialized knowledge. Thus, there exists a great need for tools to simplify the process of building an on-line service so that the process can be accomplished in less time, with fewer errors, and by a non-programmer. In some cases, software tools exist to help convert the data content for a service from a native format to the format required by the server, but these tools only address the conversion of data files. Many other facets of the process are not undertaken by tools currently available.

In order to construct an on-line service for the World Wide Web, an author must perform a combination of the tasks, including creating a new HTML document for hypertext employed by the on-line service, creating a new script used by the on-line service, retrieving and modifying an existing HTML document from the Web server machine, retrieving and modifying an existing script from the Web server machine, and storing an HTML document or script on the Web server machine so that the Web server program will have access to it.

There are several approaches known in the prior art for constructing documents and scripts usable by an on-line service, and performing the tasks noted above. During performance of the tasks discussed above, an author may need to view the connectivity of documents linked together by hypertext links. The document author may further need to navigate among linked documents while using an editing program.

One conventional method for navigating among linked documents is to simply make the links active—even during editing. Thus, a link may be followed simply by selecting it. However, this approach does not enable the entire network of links to be viewed simultaneously.

According to a second conventional method, a collection of linked documents may be represented by a web-like network of document icons connected by links. This method breaks down when the network becomes highly connected or even self-referential due to the density of information that must be presented.

A third conventional method improves somewhat on the second method. Under this third method, only a predetermined number of levels are shown. While an improvement over the second conventional method, the third method still does not solve the problem of representing the web in such a manner that links may readily be followed either forward or back from a document.

SUMMARY OF THE INVENTION

The present invention has several aspects addressing various problems in the prior art discussed above and providing other functional benefits not available through other known techniques.

One aspect of the present invention is a set of document and link data structures that store information about documents in a web of linked documents and about the links among the documents. A related aspect of the invention is a set of computer-implemented procedures to construct each of the document and link data structures.

Another aspect of the invention is a set of outline view graphical data structures that are used to implement an outline view graphical user interface. A related aspect is a set of computer-implemented procedures that use the document and link data structures and the outline view graphical data structures to implement the graphical user interface accessing the outline view.

Yet another aspect of the invention is a set of link view graphical data structures that are used to implement a graphical user interface map of the links, i.e., a "link map view." A related aspect is a set of computer-implemented procedures that use the document and link data structures and the link view graphical data structures to implement the graphical user interface for the link map view.

Finally, another aspect of the invention is the set of computer-implemented procedures to implement interaction between the link view and the outline view.

In accordance with the present invention, a method is defined for representing relationships between linked elements on a web. The method comprises the step creating a first data structure, which for each element of the web, identifies any hyperlink references to other elements of the web. In addition, a second data structure is created, which for each element of the web, identifies any hyperlink references from other elements of the web. In regard to at least one element of the web that is selected as a focus element, any links from the focus element to any other elements and any links from other elements to the focus element are graphically displayed, using the first and the second data structures to identify the links.

A graphical outline view of the web is preferably also produced, and in the outline view, relative hierarchical levels of the elements on the web are displayed. A homepage is displayed at a top level of the outline view. Other elements that are subordinate in the hierarchical levels are shown in lower levels.

In the preferred form of the invention, orphan elements are included in the first and the second data structure. The orphan elements comprise elements that are not accessible by following any link from the homepage element.

A user is enabled to selectively graphically display links to and from at least one other element that is not a focus element. In the preferred form of the invention, the elements typically comprise a plurality of hypertext markup language documents.

A link from a first element to a second element is graphically represented by an arrow extending from the first element and pointing to the second element. Because of rules applied at their creation, neither the first nor the second data structure includes duplicate link entries.

Links between the focus element and any other elements included in the first data structure are preferably graphically represented at one side of the focus element, and links between the focus element and any other elements included in the second data structure are preferably graphically represented on an opposite side of the focus element. However, other arrangements are contemplated.

Another aspect of the present invention is directed to a media adapted for distribution of a computer program to enable the computer program to be executed on a computer. When the computer program is executed by a computer, it enables a visual representation of relationships between linked elements on a web to be displayed. The functions of the computer program are thus generally consistent with the method discussed above.

Yet a further aspect of the present invention is directed to a system for graphically representing and displaying relationships between linked elements on a web. The system includes a memory, a display, and a processor. Machine instructions stored in the memory are executed by the processor to implement functions that are also generally consistent with the steps of the method just described.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 4 is a map of a master document list;

FIG. 5 is a tabular map of an index of links;

FIGS. 5A–5F are tabular maps of secondary dictionaries that serve as the values of the index of FIG. 5;

DESCRIPTION OF THE PREFERRED EMBODIMENT

Data Structures

As used herein, a "dictionary" is a data structure that contains a list of entries, where each entry contains a key and an associated value. The key and value may be any arbitrary type of data. Various types of operations can be performed on the data structures comprising a dictionary. One operation that can be performed on the dictionary is retrieving the value associated with a given key. Another operation is the removal of the dictionary entry that corresponds to a given key. Other operations are the creation of a new entry that includes a key and a corresponding value, and the replacing of the value associated with a given key with a new value. The definition of a particular dictionary may require that each key in the dictionary be unique. Attributes of a dictionary, as used in regard to the present invention, preclude duplicate key entries in a list comprising a dictionary.

Figure 1:
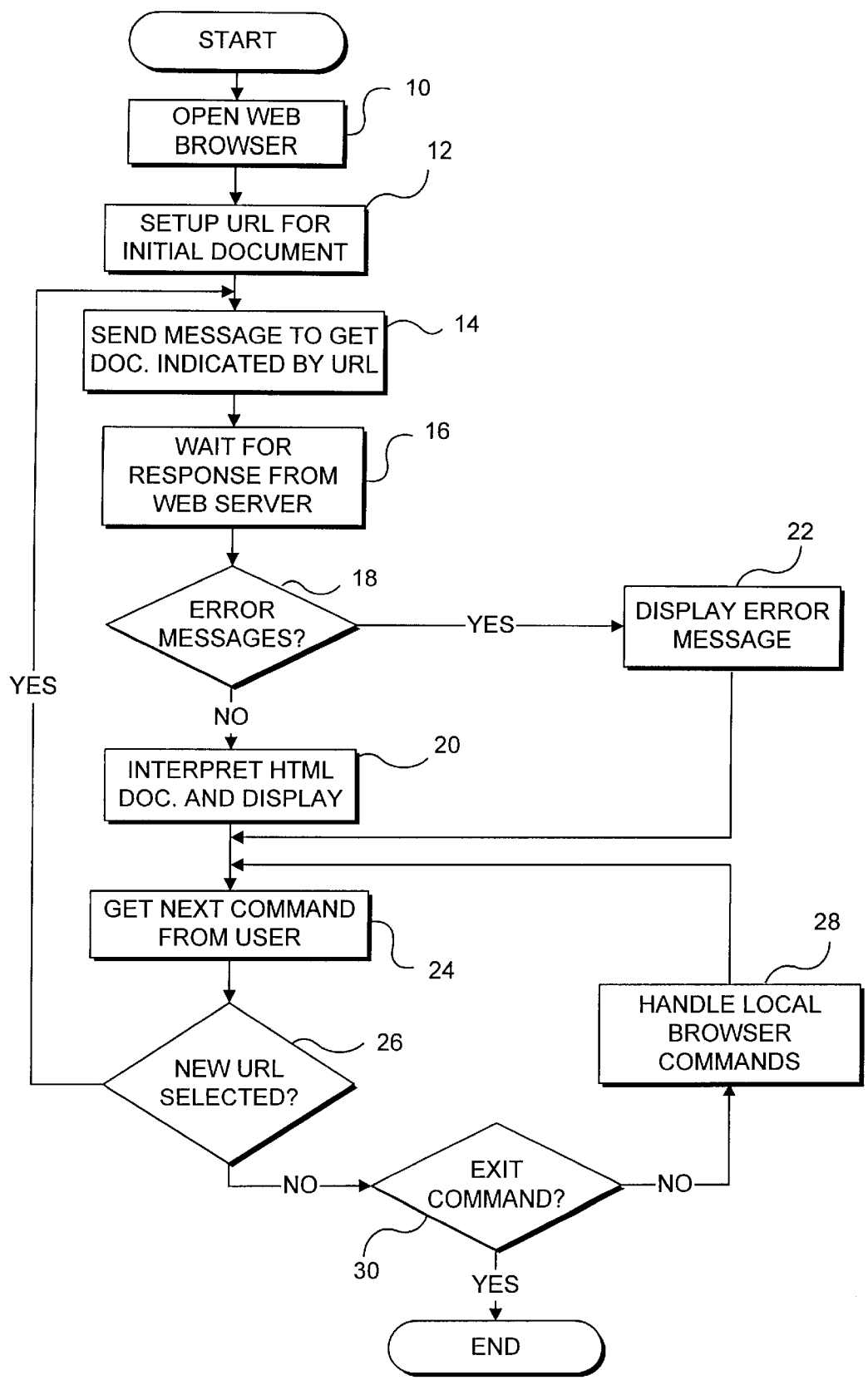
FIG. 1 (prior art) is a flowchart showing the interaction between a user and an on-line service.
Figure 2:
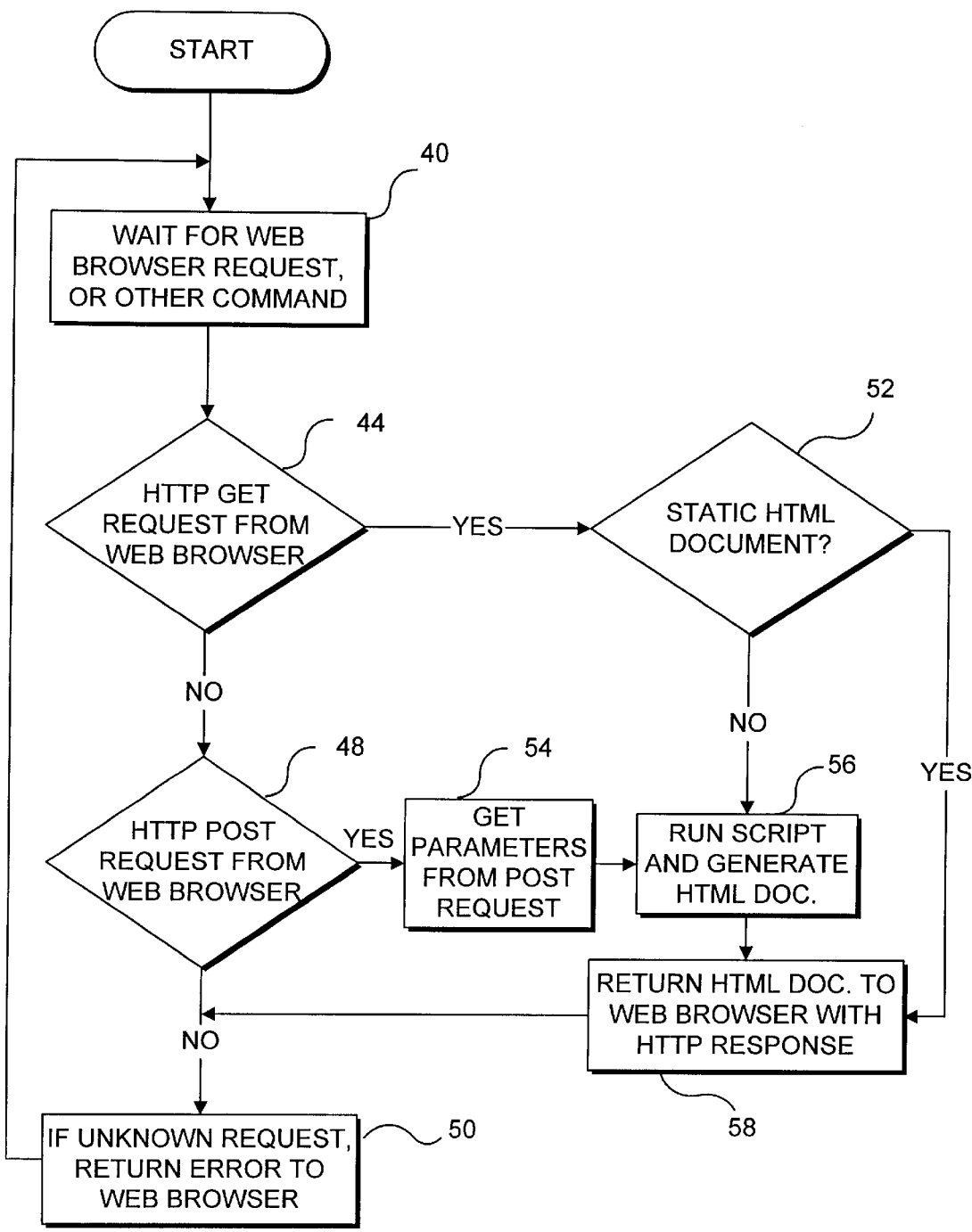
FIG. 2 (prior art) is a flowchart showing the interaction between a web server and the on-line service.
Figure 3:
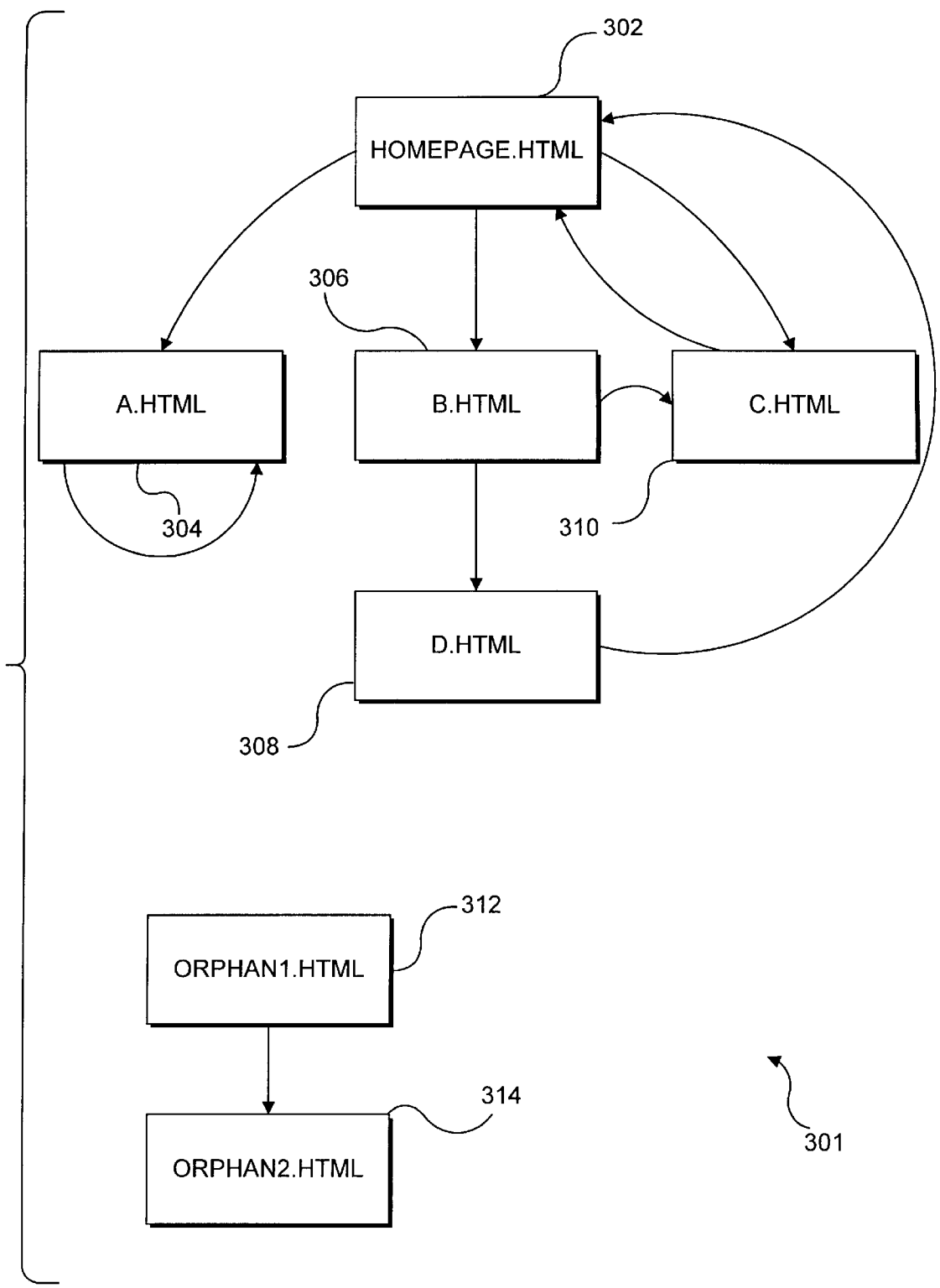
FIG. 3 is a map of the links between pages of an exemplary web.

The present invention operates on linked documents that are herein referred to as a "web." A map of linked documents forming a web 301 is shown in FIG. 3. The linked documents comprising web 301 may be stored on or accessed from one or more computer systems in a network. However, without loss of generality or limitation on the present invention, the following description specifically refers to a web whose documents are all locally stored and accessible. One of ordinary skill will understand that conventional network access mechanisms can be used to expand the procedures related to the web described below, so that they are applicable to a system that operates, for example, using Internet access mechanisms to access documents as part of the document sharing network popularly known as the World Wide Web.

There are three main document and link data structures that are used in this invention: (1) a master document list 401 shown in FIG. 4; (2) an index of links 501 shown in FIG. 5; and, (3) a list of orphan pages (not shown). Master document list 401 is a list of all documents in exemplary web 301, and is used to store for each document, a list of hypertext links from the document to other documents. The master document list is implemented as a dictionary, where keys 403 each comprise a URL for a document object, and an associated value 405 for each object is a pointer to a document structure. Each document structure contains a list of links 407 (i.e., URLs pointing to other document objects) that are contained in the document object pointed to by the key in the master document list.

Referring to FIG. 5, an index of links 501 is a list of all documents in web 301. For each document, the index of links identifies all of the other documents that have a hypertext link to the document. As shown in FIG. 5, index of links 501 is implemented as a dictionary, where each key 503 is a URL of a document object, and an associated value 505 is a secondary dictionary. As shown in the examples of FIGS. 5A–5F, each secondary dictionary contains a list of document structure pointers 509 for documents that have hypertext links to a document object, which is the document object referenced by key 503 in the example of FIG. 5. In the secondary dictionary, each key is a pointer to a document structure, and the associated value is the same as the key. The secondary dictionary implements a list of pointers to document structures, and duplicate pointers cannot be entered into the list.

To more clearly illustrate the manner in which the links between document objects in FIG. 3 are referenced in the main dictionary and secondary dictionaries, it may be helpful to provide specific examples. Exemplary master document list 401 includes a first key that is equal to the "homepage" document object. A corresponding value 407 that is shown to the right of this key is set equal to a pointer to a document structure that contains a list of each document object to which a link points from a homepage.html document object 302, as represented by arrows in FIG. 3 that extend from the homepage.html document object to document objects a.html 304, b.html 306, and c.html 310.

In exemplary index of links 501, the first entry for a key equal to homepage.html is associated with a value that is equal to secondary dictionary 1, which is shown in FIG. 5A. Referring to that Figure, a first listed key is equal to a value for a pointer to the document structure for document object c.html, and a second key is equal to a value for a pointer to the document structure for document object d.html. As shown in FIG. 3, document objects c.html 310 and d.html 308 are the two document objects from which links extend to homepage.html 302.

Figure 5B:
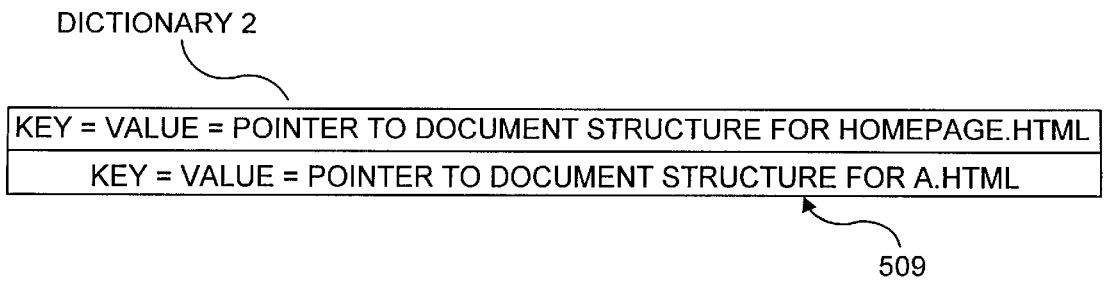
Figure 5C:
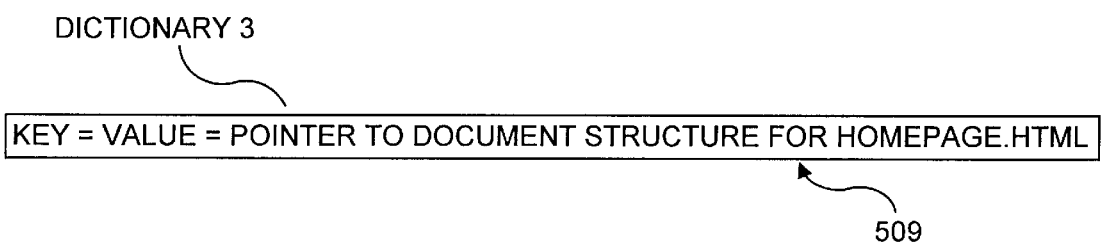
Figure 5D:
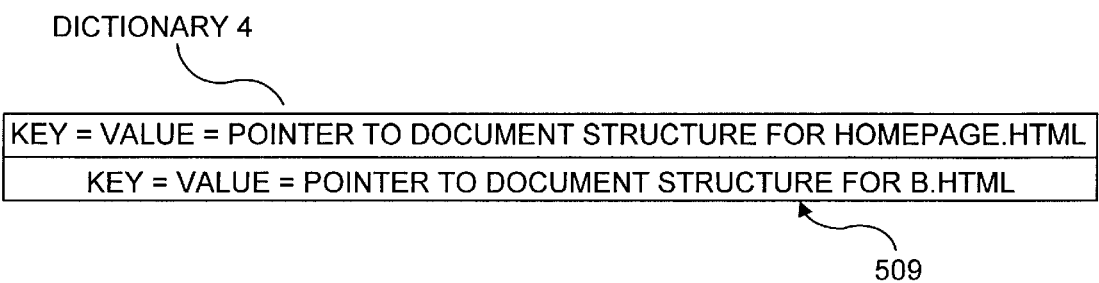
Figure 5E:
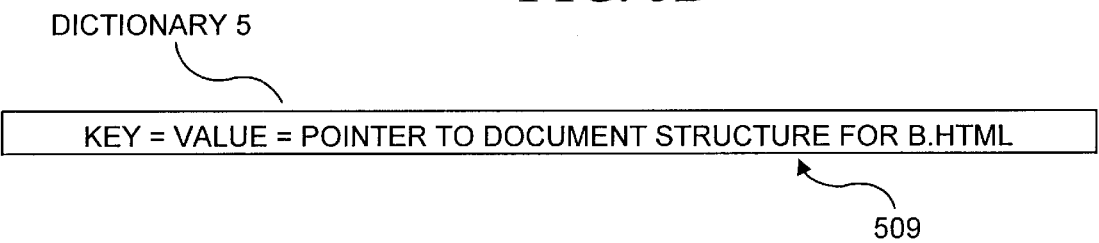
Figure 5F:
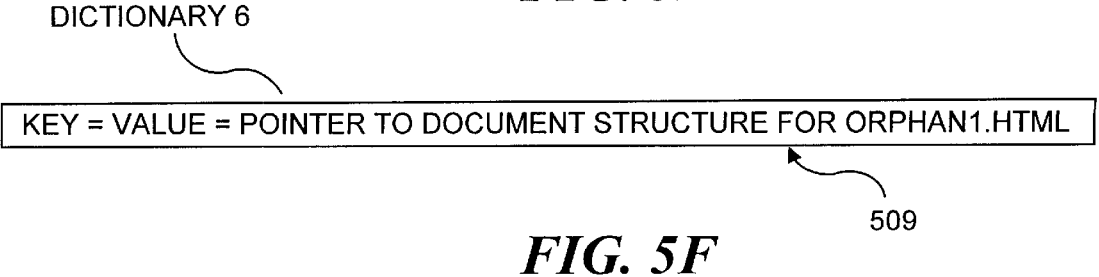

Another line in index of links 501 lists a key equal to c.html and has an associated value that is equal to secondary dictionary 4, which is illustrated in FIG. 5C. As shown in FIG. 5C, secondary dictionary 4 lists two keys, the first equal to a value for a pointer to the document structure for the homepage.html, and the second equal to a value for a pointer to the document structure for document object b.html. As shown in FIG. 3, both document objects homepage.html 302 and b.html 306 have links referencing document object c.html 310, as indicated by secondary dictionary 4.

The list of orphan pages is a list of documents that are not accessible by following links from the homepage of the web. This list is used only by the outline view, as explained below. Referring to FIG. 4, it will be apparent that no paths comprising one or more links exists that can be from the homepage to either orphan page.

The list of orphan pages is also implemented as an array of pointers to document structures. For example, master document list 401 indicates that for a key equal to orphan1.html, an associated value equals a pointer to a document structure containing a list that includes "orphan2.html." As shown in FIG. 3, a link extends from document object orphan1.html to document object orphan2.html. However, the key in column 403 of the master document list that is equal to "orphan2.html" has a value that is equal to a pointer to a document structure containing an empty list. Referring again to FIG. 3, it will be noted that document object orphan2.html 314 does not have a link pointing to any other document object. Similarly, index of links 501 also includes references to the orphan pages.

In the preferred embodiment of the present invention, dictionaries are implemented using a CMap template class that is provided in a Microsoft Foundation Classes™ library. Arrays are implemented using a CArray template class of the Microsoft Foundation Classes library. The advantage of using these particular class implementations of dictionaries and arrays is that the classes are included as part of the Microsoft Windows™ development environment. However, other implementations of array and dictionary classes could be written, or can be obtained as part of a class library from another vendor. For this discussion, it is assumed that the present invention has been incorporated in a client-server web document authoring tool; however, it could instead be implemented in a different application.

Figure 6:
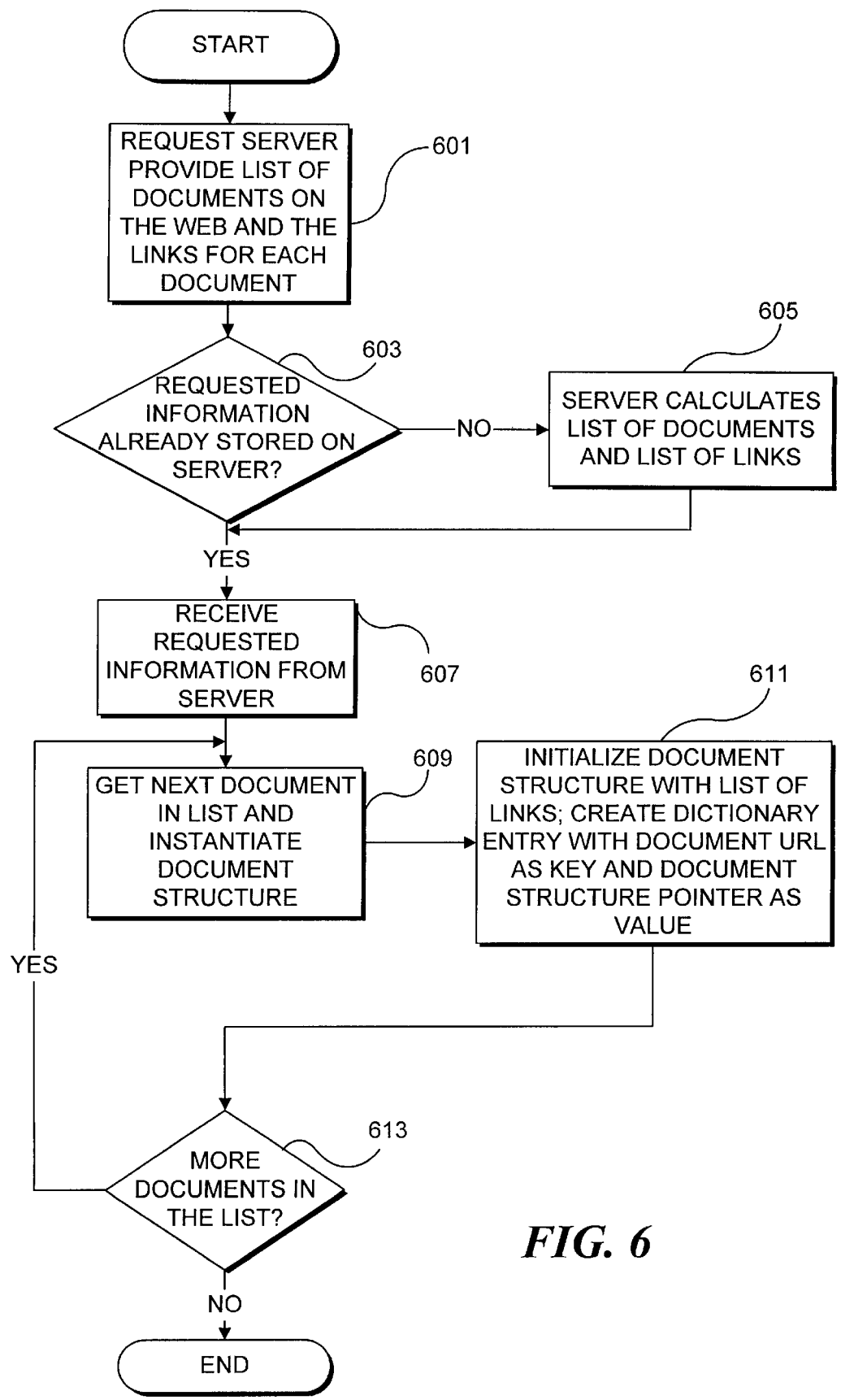
FIG. 6 is a flowchart illustrating the logical steps for creation of the master document list.

As shown in FIG. 6, the master document list is constructed by issuing a request 601 to retrieve the list of document objects in the web, and for each document object in the web, to retrieve the list of all hypertext links from that document object to other document objects, i.e., as a list of URLs. A determination is made in a step 603 as to whether the information requested is present on the server. If the information is not provided, and the web is present, the requested information is determined by the server computer in a step 605. In either case, the requested information is returned in a step 607. In alternative embodiments, the requested information may be determined by either the client or the server, either periodically or in response to each request, and stored on either the client or server computer.

After the document list and hypertext link information has been retrieved in step 607, a document structure in computer memory is instantiated for a single document object as the list in a step 609. For a given document object, a dictionary entry in the master document list is created in a step 611, using the document object URL as the key, and an associated pointer to the instantiated document structure as the value. After each document structure has been instantiated in the computer memory, the document structure is initialized with the list of all hypertext links from the corresponding document to other documents, as also provided in step 611. This process of instantiation indicated in step 609 and of creation indicated in step 611 is repeated until all document objects in the list are exhausted, as noted in a step 613.

Figure 7:
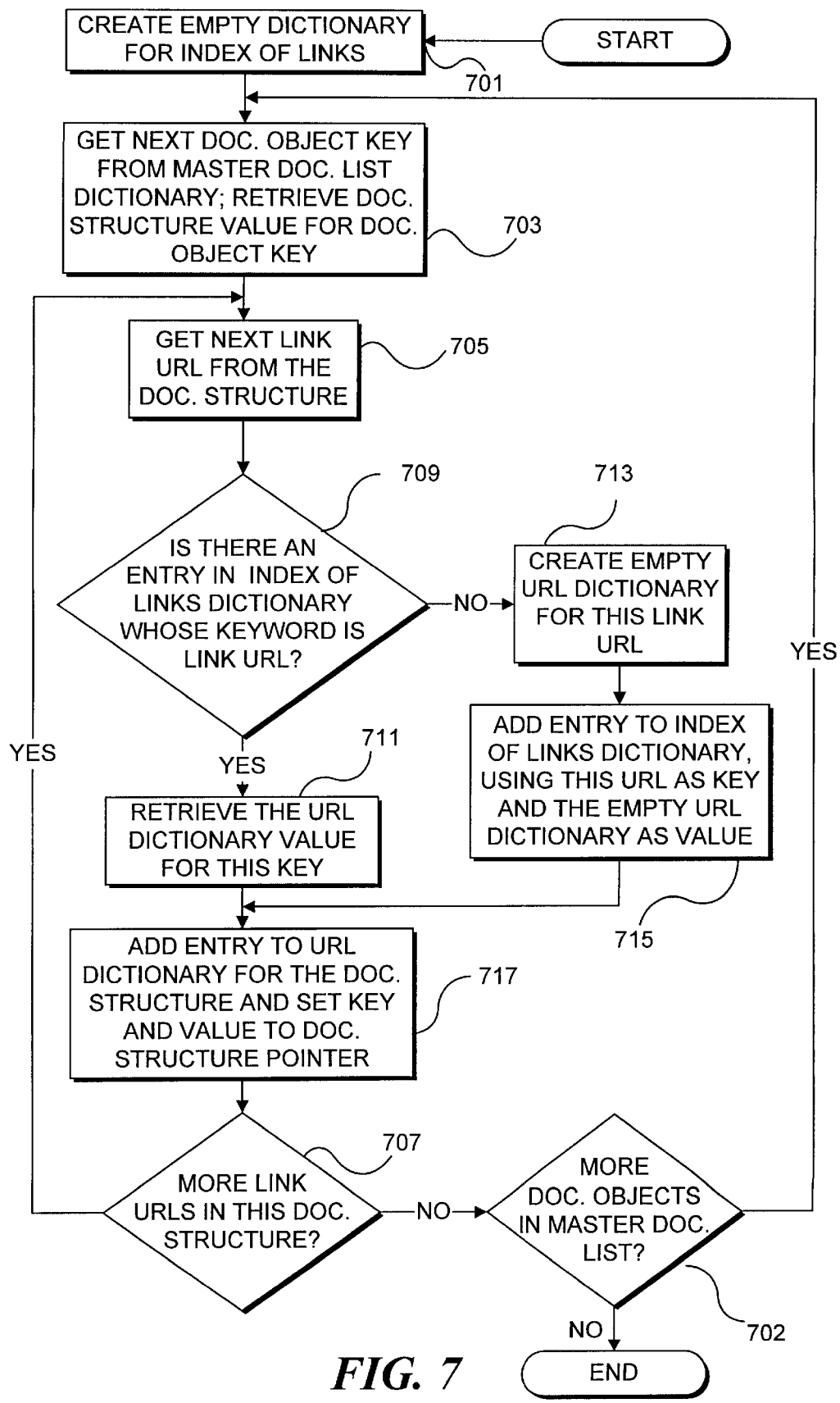
FIG. 7 is a flowchart showing the logic for creating the index of links.

As shown in FIG. 7, an index of links (e.g., like exemplary index of links 501 in FIG. 5) is constructed from a master document list. First, in a step 701, the index of links is created in computer memory as an empty dictionary. A step 702 determines if all document objects in the master document list have been processed. For each document object URL (i.e. key) in the master document list, an associated document structure (i.e., value) is retrieved in a step 703. The procedure loops through each document's list of hypertext links as provided in a step 705 until all URLs are processed as indicated in a step 707. The results are stored as the main and the secondary dictionaries. With reference to the exemplary master document list shown in FIG. 4, the main dictionary (e.g., index of links 501 in FIG. 5) will have a key value corresponding to each key in the master document list. For each URL, the index of links dictionary is examined in a step 709 to determine if there is an entry having a key equal to that URL. If such an entry is found, the dictionary value associated with the URL key is retrieved in a step 711. If the entry is not found, an empty dictionary for the URL is created in a step 713, and an entry is added to the index of links dictionary in a step 715, using the URL as the key and the newly created URL dictionary as the value. In either case, in a step 717, an entry is added to the URL dictionary for the document object taken from the master document list. This entry includes both a key and a value that is set to the document structure pointer for the original document structure that was retrieved from the master document list.

The following explanation should help to clarify the preceding steps. As an example of the steps implemented, note that the third line in index of links 501 has a key value equal to b.html. To determine whether a non-empty secondary dictionary should be created for this URL, the document structures in the master document list are searched to find any that reference b.html. In the example shown in FIG. 4, a link to b.html is found from homepage.html. Accordingly, secondary dictionary 3 shown in FIG. 5C is created, and this dictionary includes a pointer to the document structure for the homepage.html document object.

Figure 8:
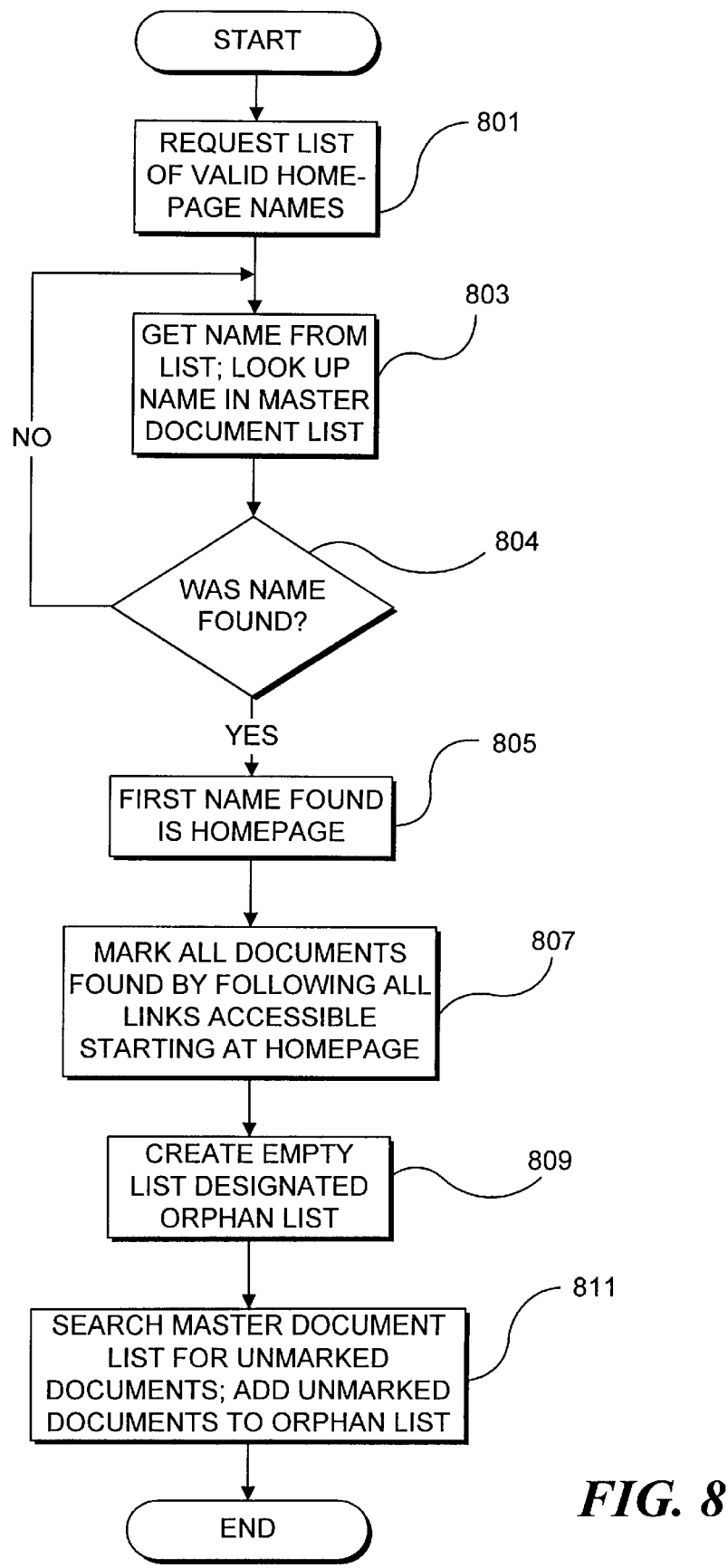
FIG. 8 is a flowchart illustrating the steps for creating the orphan list.

As shown in FIG. 8, the list of orphan pages is constructed after the master document list and index of links. First, in a step 801, the homepage for the web is identified by requesting a list of valid homepage names from the server. In steps 803 and 804, each of the names is located in the master document list of documents. The first name found is the homepage of the web, as indicated in a step 805. Next, in a step 807, links are followed from the homepage using a conventional search algorithm, marking each document as it is encountered during the search. Links from documents that have already been marked are not followed. The orphan list is created in a step 809 as an initially empty list. Finally, in a step 811, the master document list is searched for documents that have not been marked, and these documents are added to the orphan list. Images are not added to the orphan list because images are used differently than text documents in a web of documents and are thus a special case.

The data structures described above are used to implement the outline view and link view of a web under a graphical user interface, in accord with the present invention. Both of these views are described in the following section.

Outline and Link Views

The outline view has its origin at the homepage document, which is found at the top level of the outline. In this view, documents with which the homepage is linked are shown as subordinate to the homepage document. In general, a given document has links to other documents that appear as subordinate to the given document in the outline unless the other documents have already been displayed elsewhere in the outline view. Documents are shown in the outline view as text and/or bitmap "items." The graphical representation of the web in the outline view resembles the directory tree used in the Microsoft Windows™ File Manager program. In the preferred embodiment, the standard Microsoft Windows™ tree control is used to implement the outline view; although, any hierarchical list control that allows text and bitmaps for items could alternatively be used.

Figure 9:
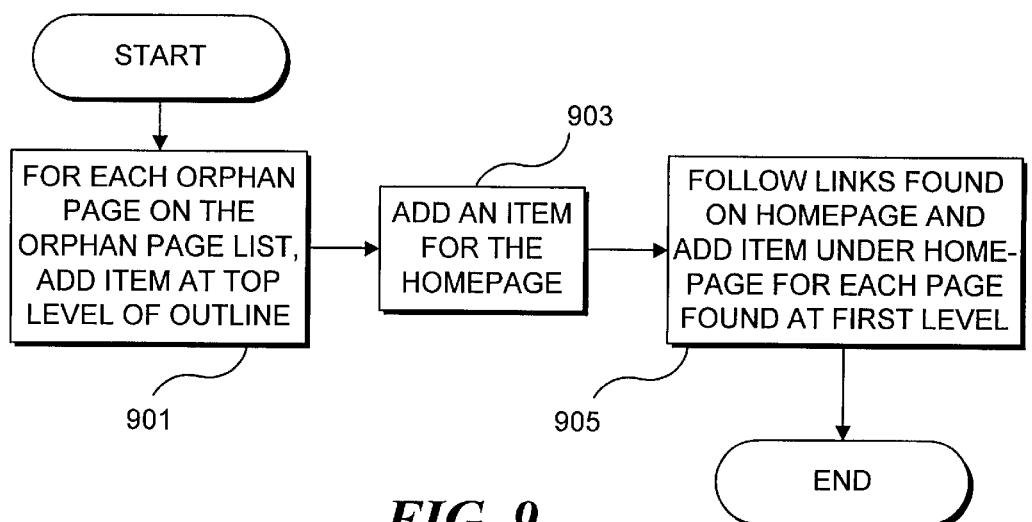
FIG. 9 is a flowchart showing the initialization of the outline view.

The method used for initializing the outline view is shown in FIG. 9. In a step 901, for each orphan page, an item is added at the top level of the outline tree. Next, in a step 903, an item representing the homepage is inserted at the top level of the outline tree. Note that a pointer to the document structure for the homepage is stored as the first item in the orphan page list. In a step 905, the tree is expanded one level deep relative to the homepage. The list of orphan pages is used exclusively for initializing the outline tree.

Using the control facilities of the graphical user interface, the user expands the outline view for a given document by clicking on that document. Expanding the outline for a given document means that all hypertext links from the given document to other documents are followed, and names and icons for these other documents are displayed as subordinate to the given document in the outline. Since the link following and document displaying process can continue to an infinite depth in the case of self-referential or closed loop links, display limiting criteria are used.

Figure 10:
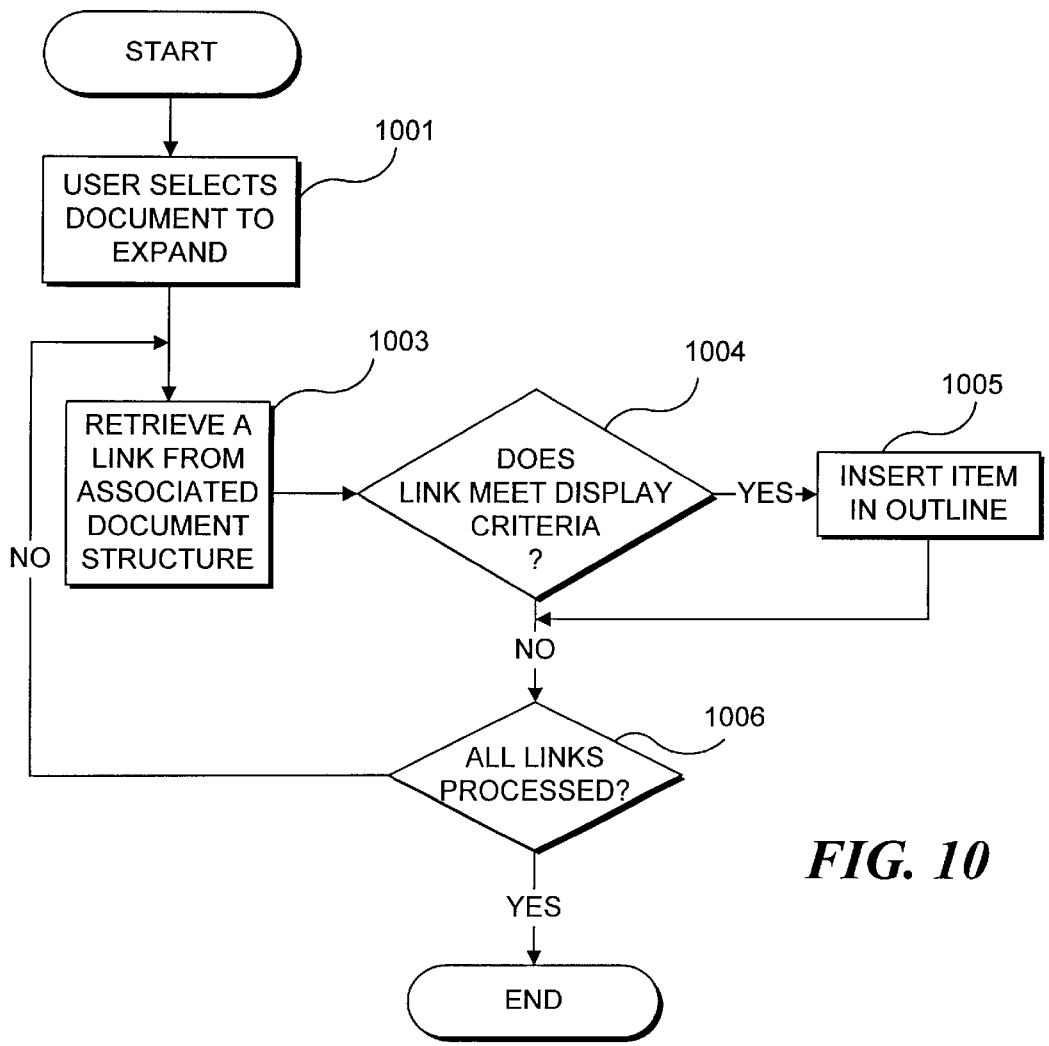
FIG. 10 is a flowchart for the expansion of the outline by one level.

As shown in a step 1001 in FIG. 10, a document is selected by a user for expansion in the outline view. In a step 1003, the program retrieves a hypertext link (URL) from the associated document structure, and in a step 1004, determines if the link fits the current criteria that limit the documents displayed. There may be criteria that control the display of image documents, or the display of hypertext links from a document to itself, or the display of duplicate documents. For example, one useful set of criteria is: (1) do not display image documents; (2) display self-references; and, (3) do not display further links from a second instance of a document already displayed at a higher hierarchical level. The depth of self-referential display is limited by the third criterion. If the hypertext link fits the criteria, the URL for this link is used to retrieve the associated document structure from the master document list, and to insert an item in the outline tree for the document, as noted in a step 1005. A step 1006 determines if all links have been processed, and if not, loops back to step 1003 to repeat the process.

Each document structure contains an outline view object. When a document is added to the outline tree, for example, when a branch of the tree is expanded to a level that includes the document, its outline view object is updated with a reference to its outline tree item. This step serves two purposes: (1) it makes it possible to quickly find an outline tree item given a document structure; and, (2) it makes it possible to determine if a given document structure is already represented in the outline view. Detecting whether a document structure has already been represented helps to prevent the creation of a recursive tree, where a document in the tree or one of its link descendants has a link to the document in the tree.

In another aspect of this invention, it is sometimes necessary to immediately expand the outline view from the homepage document down to an identified descendent document in the outline hierarchy, without manually stepping through each intervening level. For example, suppose the invention is used as part of an Editor software program. The Editor may access or create a document anywhere in the web hierarchy. When a document is saved from the Editor, or when a new document is added to the web, or when the user employs a feature of the user interface allowing the user to find an arbitrary document in the outline view, expansion of the outline to the identified descendent document is required. The expansion of the outline view to display the identified document is done by doing a breadth-first search for the document, starting at the homepage. The search is extended to each of the orphan pages if the document is not found in any branch of the links from the homepage. The search results is a chain of one or more URLs from the homepage document to the document. A breadth-first search is used because it simulates the way a typical user navigates the outline tree. However, a depth-first search could alternatively be used.

The link map view shows a starting document, which serves as the focus, all documents that the starting document links to, and all documents that link to the starting document. Each document is displayed as a graphical icon, and each link between two documents is displayed as an arrow extending from a document containing the link to the target document of the link. The link map view may also show documents that are two or more links removed from the starting document in the same manner.

Figure 11:
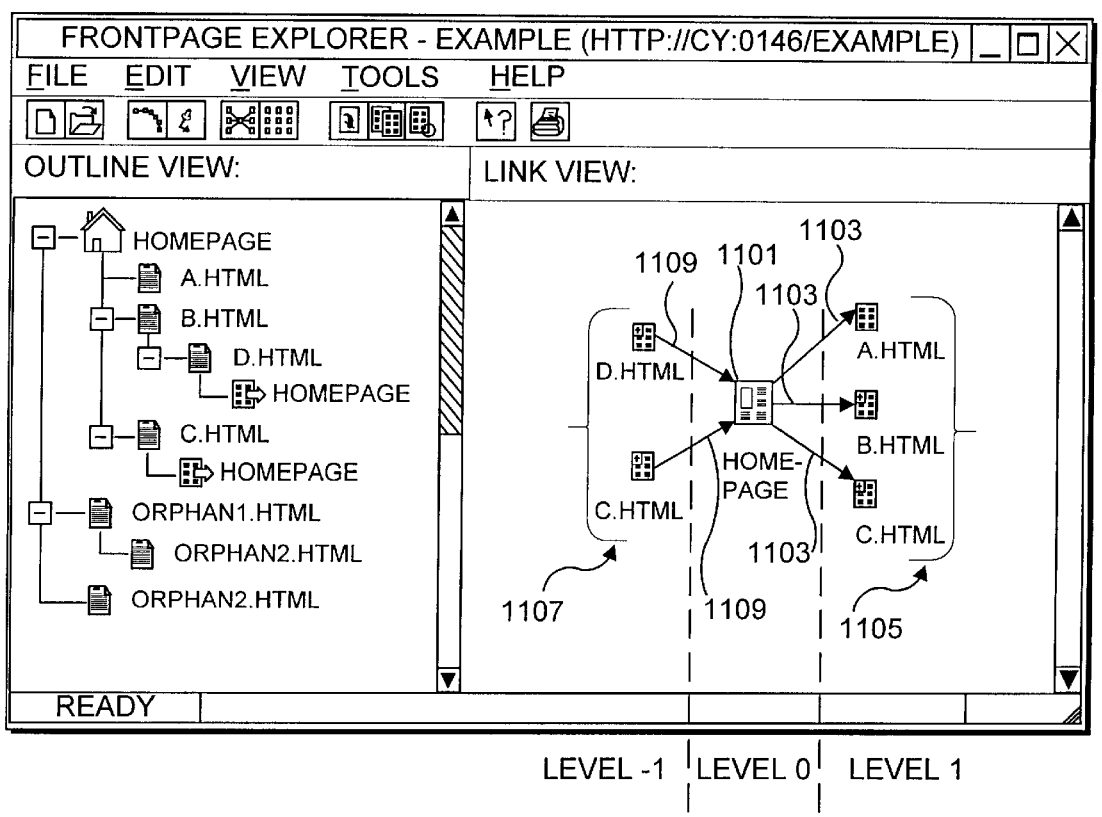
FIG. 11 is a screen view showing both the outline view and link view of one embodiment of the present invention.

An exemplary link view display for the web of FIG. 3 is shown in FIG. 11. A "focus" document 1101 is displayed at the center of the link view, at a level 0. Focus document 1101 has links 1103 to other documents 1105 that are shown to the right of the focus document, at a level 1. Each of links 1103 is shown as an arrow extending from focus document 1101 to one of documents 1105 at level 1. Documents 1107 that have links 1109 to focus document 1101 are shown to the left of the focus document, i.e., at level −1. Each of links 1109 is shown as an arrow extending from one of documents 1107 at level −1 to focus document 1101.

Figure 11A:
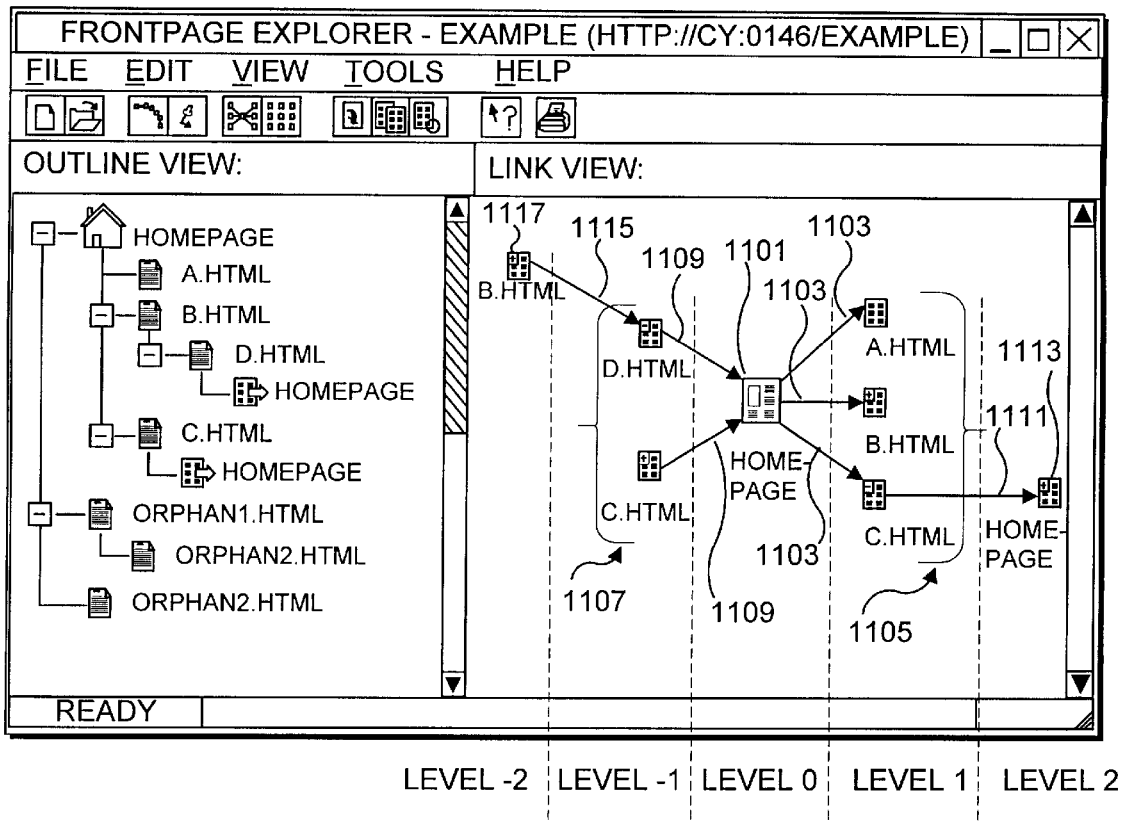
FIG. 11A is the screen view of FIG. 11, illustrating the expansion of two documents.

In accordance with the currently described embodiment, at the focus document level (level 0) and at each level to the right of the focus document (positive levels), only one document at a given level may be expanded to show links to documents at the next higher level. Similarly, in accordance with this embodiment, at the focus document level (level 0) and at each level to the left of the focus document (negative levels), only one document at a given level may be expanded to show links from documents at the next lower level. FIG. 11A shows the link view of FIG. 11 after expansion of links 1111 from a document "c.html" to other documents 1113, and the expansion of links 1115 from other documents 1117 to a document "d.html."

In the exemplary embodiment, some of the details of the link view are implemented using the methods and data structures of two of the Microsoft Foundation Classes for Windows™, specifically, the scrollable view class (CScrollView) and the image list control class (CImageCtrl). The scrollable view class implements the graphical user interface for a scrollable window that gives a partial view of a link map that may be too large to display all at once. The image list class manages the storage and display of image bitmaps. The link view could also be implemented with custom programming for the scrolling window and bitmap drawing mechanisms, or by using a graphical class library from another vendor. The lists used with link view data structures are based on the CArray class of the Microsoft Foundation Classes.

Figure 12:
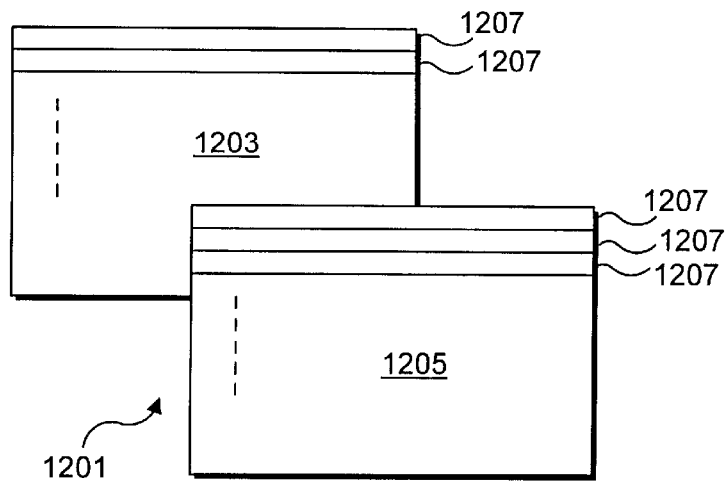
FIG. 12 is a representation of a link view object.

The data and program structure of the link view maps closely to the visible structure of the view. Each document icon displayed in the link view is represented internally by a link view object data structure as illustrated by the example of FIG. 12. In this example, there is a "focus" link view object 1201, representing focus document 1101, which contains two lists: (1) a list 1203 of link view objects for documents that have links to focus document 1101; and, (2) a list 1205 of link view objects for documents that have links from the focus document. Each link view object 1207 contains a pointer to a document structure.

Figure 13:
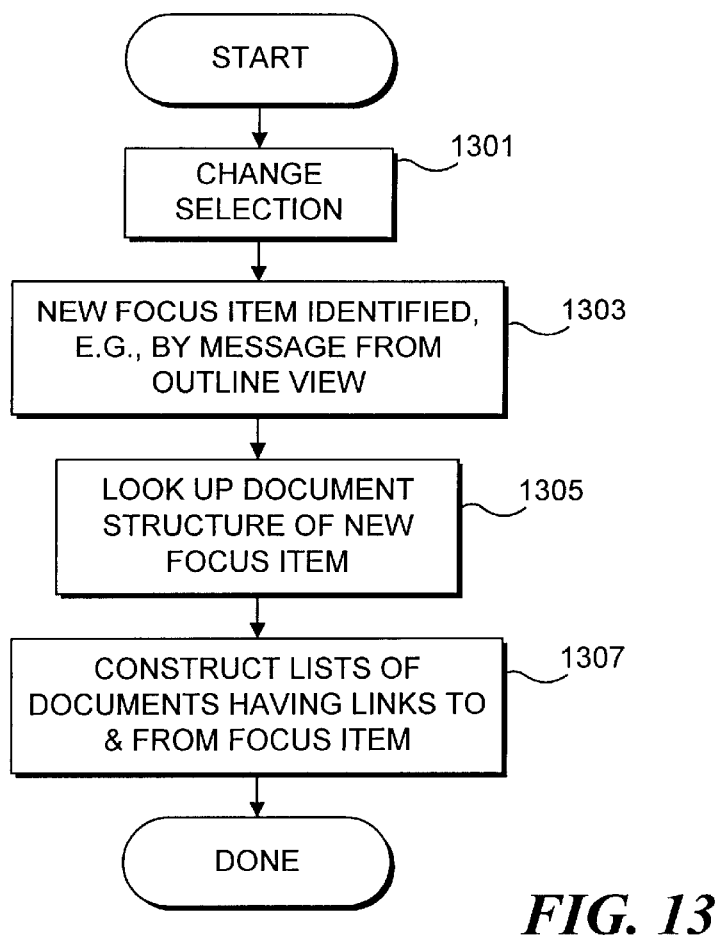
FIG. 13 is a flowchart showing the logic for the creation of a link view object.

Link view graphical data structures corresponding to a current state of the link view are built each time the focus item changes, for example, when the user changes the selection in the outline view or selects a command such as "move to center" from a link view context menu. FIG. 13 shows the steps implemented when the selection is changed in the outline view, beginning with a step 1301. In a step 1303, the link view program structure is passed a message from the outline view containing the URL for the new focus item. The URL of the new focus item is used to look up the document structure of the new focus item in the main dictionary in a step 1305. Next, a list of documents having links to the focus document, and a list of documents having links from the focus document are constructed in a step 1307. In the case where the URL is not found in the main dictionary, it may be concluded that there are no links from the focus document to other documents. The list of documents that have links to the focus document is built by looking up the URL of the focus document in the index of links.

For each document icon at level 0 or greater, the links to other documents can selectively be expanded to show all of those documents, or collapsed to NOT show the documents. Similarly, for each document icon at level 0 or less (negative or zero levels), the links from other documents can be expanded or collapsed to selectively show or NOT show the documents. For ease of layout and display, the link view embodiments currently in use only permits a single document item to be expanded at each level other than level 0. Thus, rather than mapping the entire web in this view, only the documents "close" to the focus document are mapped.

The link view program structures expand links from a given document to other documents, or to a given document from other documents in the same manner as done when determining the list of links for the focus document. In the case of links to a given document, the program looks up the URL in the index of links. In the case of links from the given document, the program looks up the URL in the main document dictionary.

Figure 14:
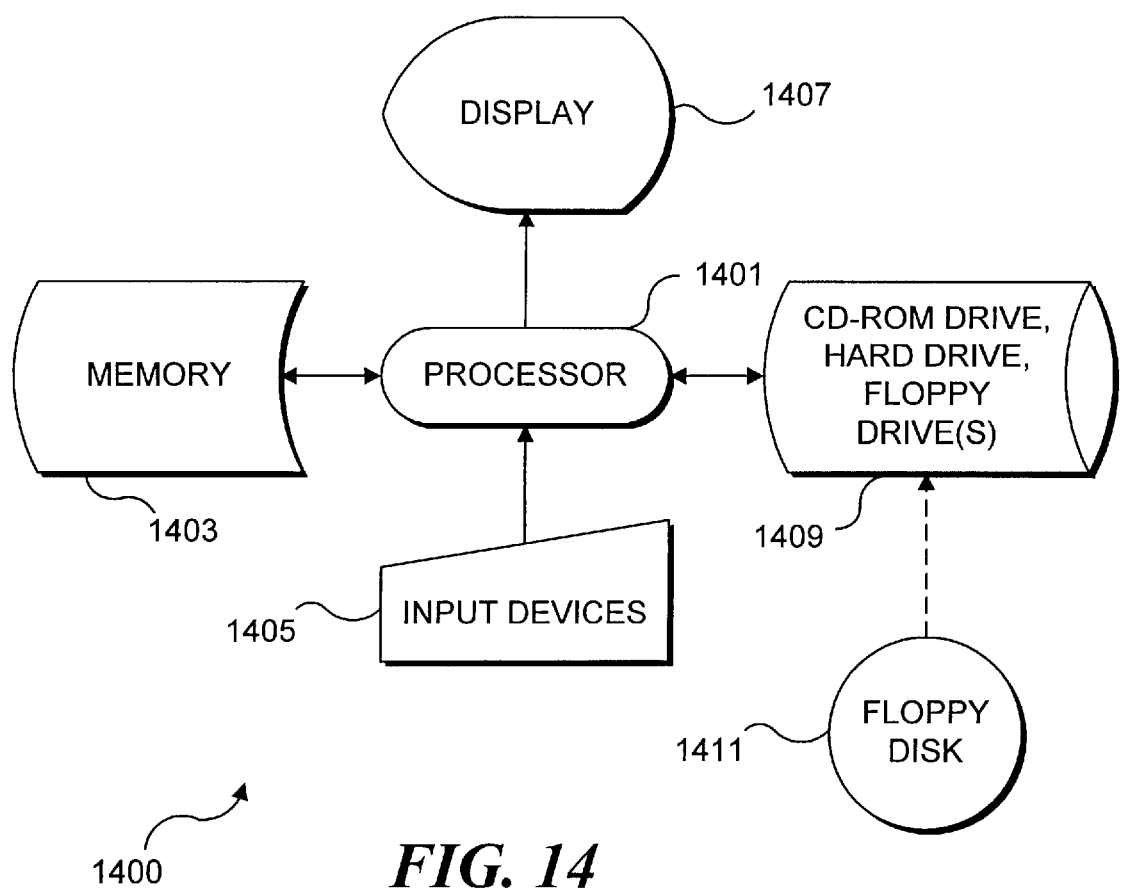
FIG. 14 is a schematic block diagram of the functional components of a computer used in implementing the present invention.

It is likely that software comprising machine instructions used to implement the present invention will be distributed either over a network or stored on a non-volatile storage media such as a floppy disk or a compact disk-read only memory (CD-ROM) disk for distribution to end users. The invention will likely be initially provided as a client-server web document authoring tool software program, but it is also contemplated that it might be provided as a module in other types of software programs. As indicated in FIG. 14, a floppy disk 1411 on which are stored machine instructions appropriate to cause a processor 1401 to implement the logic of the present invention as discussed above can be loaded into a floppy disk drive 1409 and stored on the hard drive of a personal computer 1400. When the program comprising these machine instructions is executed by computer 1400, the machine instructions are loaded in memory 1403, which includes random access memory RAM (not separately shown). Any user interaction with the program is provided through input devices 1405, which includes a keyboard and a mouse or other pointing device (also not separately shown). The data structures developed to graphically represent the links interconnecting documents in a web are then stored in memory 1403 and/or on the hard drive, so that the outline view and link view can be presented on a display 1407, as described above.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for representing relationships between elements that are linked together by hypertext links so as to form a web, comprising the steps of:
   (a) creating a first data structure, which for each element of the web, identifies any hypertext links to other elements of the web;
   (b) creating a second data structure, which for each element of the web, identifies any hypertext links from other elements of the web; and
   (c) in regard to at least one element of the web selected as a focus element, graphically displaying any hypertext links from said focus element to any other elements and any hypertext links from other elements to said focus element, using the first and the second data structures.

2. The method of claim 1, further comprising the step of producing a graphical outline view of the web in which relative hierarchical levels of the elements on the web are displayed.

3. The method of claim 2, wherein a homepage is displayed at a top level of the outline view, other elements that are subordinate in the hierarchical levels being shown in lower levels.

4. The method of claim 1, further comprising the step of including orphan elements in the first and the second data structure, said orphan elements comprising elements that are not accessible by following any hypertext link from a homepage element.

5. The method of claim 1, further comprising the step of enabling a user to selectively graphically display hypertext links to and from at least one other element that is not the focus element.

6. The method of claim 1, wherein the elements comprise a plurality of hypertext markup language documents.

7. The method of claim 1, wherein a hypertext link from a first element to a second element is graphically represented by an arrow extending from the first element and pointing to the second element.

8. The method of claim 1, wherein neither the first nor the second data structure includes duplicate hypertext link entries.

9. The method of claim 1, wherein hypertext links between the focus element and any other elements included in the first data structure are graphically represented at one side of the focus element, and hypertext links between the focus element and any other elements included in the second data structure are graphically represented on an opposite side of the focus element.

10. A method for representing relationships between elements that are linked together by hypertext links so as to form a web, comprising the steps of:
   (a) creating a master list of elements in the web, said master list storing for each element, a list of hypertext link references associated with elements that link from said element;
   (b) creating an index of links for the elements in the web, said index of links associating with each element a list of elements that contain a hypertext link to said element;
   (c) producing a graphical outline view of the web in which a homepage is displayed at a top level, said outline view showing hierarchical levels of other elements that are linked to the homepage in subordinate positions, based upon the master list and the index of links; and
   (d) graphically expanding any selected element in the outline view, to produce a link view comprising a hypertext link map displaying hypertext linkages to the selected element from other elements and hypertext linkages to other elements from the selected element.

11. The method of claim 10, further comprising the step of creating a list of any orphan elements on the web, said orphan elements comprising elements that are not accessible by following any link from the homepage.

12. The method of claim 10, wherein each of the unique keys comprise a uniform resource locator for one of the elements of the web.

13. The method of claim 10, wherein the hypertex link references each comprise a uniform resource locator.

14. The method of claim 10, wherein the elements comprise a plurality of hypertext markup language documents.

15. The method of claim 10, wherein one of the elements is disposed at a level zero, and wherein the link view includes graphic arrows representing hypertext linkages between other elements that are at non-zero levels and said one element.

16. The method of claim 15, wherein at least one of the elements displayed in the link view at a non-zero level is selectively expandable to display its linkage to the other elements.

17. The method of claim 15, wherein in the link view, the linkages between said selected element and the other elements are selectively contractible so that the linkages are not displayed.

18. The method of claim 10, wherein said selected element in the object view is expanded to create the link view, without manually stepping through any intervening levels between the homepage and said selected element.

19. The method of claim 10, wherein the master list comprises a primary dictionary, and wherein each element is assigned a unique key and is associated with a pointer to a document structure containing a list of hypertext link references to said element.

20. The method of claim 19, wherein each element is referenced by the unique key assigned to it and is associated with a secondary dictionary, said secondary dictionary containing a list of hypertext link references identifying elements that contain a hypertext link to the element with which said secondary dictionary is associated.

21. The method of claim 20, wherein duplicate pointers are not permitted within any secondary dictionary.

22. A media adapted for distribution of a computer program to enable the computer program to be executed on a computer, said computer program enabling a visual representation of relationships between elements that are linked together by hypertext links so as to form a web, the visual representation being displayed when the computer program is executed by a computer, comprising:
   (a) a memory media; and
   (b) a plurality of machine instructions comprising the computer program, which are stored on the memory media, said plurality of machine instructions when executed by a computer causing the computer to:
      (i) create a first data structure, which for each element of the web, identifies any hypertext links to other elements of the web;
      (ii) create a second data structure, which for each element of the web, identifies any hypertext links from other elements of the web; and
      (iii) in regard to at least one element of the web selected as a focus element, graphically display any links from said focus element to any other elements and any hypertext links from other elements to said focus element, using the first and the second data structures.

23. The media of claim 22, wherein the machine instructions, when executed by a computer, further display a graphical outline view of the web in which relative hierarchical levels of the elements on the web are indicated.

24. The media of claim 23, wherein the machine instructions, when executed by a computer, display a homepage at a top level of the outline view, other elements that are subordinate in the hierarchical levels being shown in lower levels.

25. The media of claim 22, wherein the machine instructions, when executed by a computer, include orphan elements in the first and the second data structure for display, said orphan elements comprising elements that are not accessible by following any hypertext link from the homepage element.

26. The media of claim 22, wherein the machine instructions, when executed by a computer, enable a user to selectively graphically display hypertext links to and from at least one other element that is not a focus element.

27. The media of claim 23, wherein the elements comprise a plurality of hypertext markup language documents.

28. The media of claim 22, wherein the machine instructions, when executed by a computer, graphically display a hypertext link from a first element to a second element using an arrow extending from the first element and pointing to the second element.

29. The media of claim 22, wherein neither the first nor the second data structure includes duplicate hypertext link entries.

30. The media of claim 22, wherein the machine instructions, when executed by a computer, graphically represent hypertext links between the focus element and any other elements included in the first data structure at one side of the focus element, and hypertext links between the focus element and any other elements included in the second data structure on an opposite side of the focus element.

31. A system for graphically representing and displaying relationships between elements that are linked together by hyperlinks so as to form a web, comprising:
   (a) a memory in which a plurality of machine instructions are stored;
   (b) a display; and
   (c) a processor that is coupled to the memory to access the machine instructions and to the display, said processor executing said machine instructions to implement a plurality of functions, said functions including:
      (i) creating a first data structure, which for each element of the web identifies any hyperlinks to other elements of the web;
      (ii) creating a second data structure, which for each element of the web identifies any hyperlinks from other elements of the web; and
      (iii) in regard to at least one element of the web selected as a focus element, graphically displaying any hyperlinks from said focus element to any other elements and any hyperlinks from other elements to said focus element on the display, using the first and the second data structures.

32. The system of claim 31, wherein the machine instructions, when executed by the processor, cause the processor to present a graphical outline view of the web on the display based upon the first and second data structures, in which relative hierarchical levels of the elements on the web are indicated.

33. The system of claim 32, wherein the machine instructions, when executed by the processor, cause the processor to represent a homepage at a top level of the outline view, other elements that are subordinate to the homepage being shown in lower levels on the display.

34. The system of claim 31, wherein the machine instructions, when executed by the processor, cause the processor to include orphan elements in the first and the second data structure shown on the display, said orphan elements comprising elements that are not accessible by following any link from the homepage element.

35. The system of claim 31, wherein the machine instructions, when executed by the processor, cause the processor to enable a user to selectively graphically display hyperlinks to and from at least one other element that is not a focus element.

36. The system of claim 31, wherein the elements comprise a plurality of hypertext markup language documents.

37. The system of claim 31, wherein the machine instructions, when executed by the processor, cause the processor to graphically display a hyperlink from a first element to a second element on the display, using an arrow extending from the first element and pointing to the second element.

38. The system of claim 31, wherein neither the first nor the second data structure includes duplicate hyperlink entries.

39. The system of claim 31, wherein the machine instructions, when executed by the processor, cause the processor to graphically represent hyperlinks between the focus element and any other elements included in the first data structure at one side of the focus element in the display, and hyperlinks between the focus element and any other elements included in the second data structure on an opposite side of the focus element in the display.

40. A method for representing relationships between elements that are linked together by hypertext links so as to form a web, comprising the steps of:

(a) creating a first data structure, which for each element of the web, identifies any hypertext links to other elements of the web;

(b) creating a second data structure, which for each element of the web, identifies any hypertext links from other elements of the web; and (c) using information contained in the first and second data structures, producing a graphical outline view of the web in which relative hierarchical levels of the elements on the web are displayed.

* * * * *

UNITED STATES PATENT AND TRADEMARK OFFICE
CERTIFICATE OF CORRECTION

PATENT NO. : 6,189,019 B1
DATED : February 13, 2001
INVENTOR(S) : Blumer et al.

It is certified that error appears in the above-identified patent and that said Letters Patent is hereby corrected as shown below:

Item [56], U.S. PATENTS, 4th Reference, "5,717,922 2/1998 Hohensee et al."
should read -- 5,717,922 11/1998 Hohensee et al. --

Item [56], OTHER PUBLICATIONS, 1st Reference, "Evaluation,System"
should read -- Evaluation, System --

<u>Column 19,</u>
Line 58, "Claim 23" should read -- Claim 22 --

Signed and Sealed this

First Day of January, 2002

Attest:

JAMES E. ROGAN
*Attesting Officer*   *Director of the United States Patent and Trademark Office*